United States Patent
Seo et al.

(10) Patent No.: US 9,787,451 B2
(45) Date of Patent: Oct. 10, 2017

(54) METHOD AND APPARATUS FOR TRANSMITTING A SOUNDING REFERENCE SIGNAL BY A TERMINAL

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 14/002,289

(22) PCT Filed: Mar. 2, 2012

(86) PCT No.: PCT/KR2012/001573
§ 371 (c)(1),
(2), (4) Date: Dec. 11, 2013

(87) PCT Pub. No.: WO2012/118343
PCT Pub. Date: Sep. 7, 2012

(65) Prior Publication Data
US 2014/0086167 A1    Mar. 27, 2014

Related U.S. Application Data

(60) Provisional application No. 61/448,619, filed on Mar. 2, 2011.

(51) Int. Cl.
*H04L 5/00* (2006.01)
*H04W 72/04* (2009.01)
(Continued)

(52) U.S. Cl.
CPC ............ *H04L 5/0053* (2013.01); *H04L 5/001* (2013.01); *H04L 5/0035* (2013.01);
(Continued)

(58) Field of Classification Search
CPC .................. H04L 5/0035; H04L 5/0057; H04W 72/0413
See application file for complete search history.

(56) References Cited

U.S. PATENT DOCUMENTS

| | | | |
|---|---|---|---|
| 8,855,132 B2 * | 10/2014 | Lohr | H04L 1/0026 370/431 |
| 2011/0199944 A1 * | 8/2011 | Chen | H04L 5/0007 370/280 |

(Continued)

FOREIGN PATENT DOCUMENTS

| | | | | |
|---|---|---|---|---|
| GB | WO 2011059229 A2 * | 5/2011 | ........... | H04L 1/1851 |
| JP | WO 2011082814 A1 * | 7/2011 | ........... | H04L 5/0053 |

(Continued)

OTHER PUBLICATIONS

3GPP, "3rd Generation Partnership Project; Technical Specification Group Radio Access Network; Evolved Universal Terrestrial Radio Access (E-UTRA); Further advancements for E-UTRA physical layer aspects (Release 9)." 3GPP TR 36.814 V9.0.0, Mar. 2010, pp. 1-104.

(Continued)

*Primary Examiner* — Jae Y Lee
*Assistant Examiner* — Aixa A Guadalupe
(74) *Attorney, Agent, or Firm* — Birch, Stewart, Kolasch & Birch, LLP

(57) ABSTRACT

Provided is a method for transmitting a sounding reference signal by a terminal, and a terminal using the method. The method comprises the following steps: receiving carrier information indicating the carrier via which a sounding reference signal is to be transmitted; receiving a physical downlink shared channel (PDSCH) through a first downlink component carrier; and transmitting a sounding reference signal through a second downlink component carrier, (Continued)

wherein the second downlink component carrier is determined based on the carrier information.

2 Claims, 15 Drawing Sheets

(51) Int. Cl.
*H04B 7/06* (2006.01)
*H04L 25/02* (2006.01)

(52) U.S. Cl.
CPC .......... *H04L 5/0048* (2013.01); *H04L 5/0078* (2013.01); *H04W 72/0453* (2013.01); *H04B 7/0671* (2013.01); *H04L 25/0226* (2013.01); *H04W 72/0413* (2013.01)

(56) References Cited

U.S. PATENT DOCUMENTS

2011/0261716 A1  10/2011  Kim et al.
2012/0213096 A1*  8/2012  Krishnamurthy et al. ... 370/252
2012/0281654 A1*  11/2012  Aiba et al. .................... 370/329
2013/0039311 A1  2/2013  Yang et al.

FOREIGN PATENT DOCUMENTS

| | | | |
|---|---|---|---|
| JP | WO 2011083746 A1 * | 7/2011 | .......... H04L 5/0007 |
| KR | 10-2010-0083684 A | 7/2010 | |
| KR | 10-2010-0131912 A | 12/2010 | |

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)." 3GPP TS 36.213 V10.0.1, Dec. 2010, pp. 1-98.

* cited by examiner

METHOD AND APPARATUS FOR TRANSMITTING A SOUNDING REFERENCE SIGNAL BY A TERMINAL

CROSS REFERENCE TO RELATED APPLICATIONS

This application is the National Phase of PCT/KR2012/001573 filed on Mar. 2, 2012, which claims priority under 35 U.S.C. 119(e) to U.S. Provisional Application No. 61/448,619, all of which are hereby expressly incorporated by reference into the present application.

BACKGROUND OF THE INVENTION

Field of the Invention

This specification relates to a wireless communication, and more particularly, to a method and apparatus for transmitting a sound reference signal by a terminal.

Related Art

The third generation after the next generation mobile communication system IMT (International Mobile Telecommunication)-Advanced standardization work in the ITU-R (International Telecommunication Union Radio communication sector). The support of multimedia services in IP (Internet Protocol)-based IMT-Advanced stop and slow the progress of the move from 1 Gbps to 100 Mbps data transfer rate from the fast-moving state and goal.

The 3GPP (3rd Generation Partnership Project) transmission scheme based on OFDMA (Orthogonal Frequency Division Multiple Access)/SC-FDMA (Single Carrier-Frequency Division Multiple Access) system to meet the requirements of IMT-Advanced standard LTE (Long Term Evolution improved LTE-Advanced) is being prepared. LTE-Advanced is one of the prime candidates for IMT-Advanced.

Some examples which may be applied to a next-generation communication technology such as LTE-A are carrier aggregation (CA) and cooperated multi-point transmission. The CA is a technology that provides a broadband by aggregating a plurality of carriers including a narrow band. The cooperated transmission is a technology that improves and system performance and efficiency by transmitting signals to the same receiving terminal by cooperation of a plurality of transmitting terminals.

Further, the terminal transmits reference signals to measure the uplink channel state. A reference signal, which is not related with uplink data or uplink control information which is transmitted by the terminal among such reference signals, is called a sounding reference signal (SRS). The sounding reference signal may 1) be periodically transmitted or 2) receive a triggering signal, and then be aperiodically transmitted.

According to a conventional art, it has been stipulated that a carrier which is used when aperiodically transmitting a sounding reference signal is an uplink carrier linked by a downlink carrier via which a data channel has been received, and system information. However, when carriers are aggregated, the terminal may receive a data channel via the downlink carrier without the linked uplink carrier. Furthermore, at the cooperative transmission, even if a data channel is received through the downlink carrier with the linked uplink carrier, the uplink transmission through the linked uplink carrier may not be set at the time point when the sounding reference signal is transmitted.

Hence, there is a need for a method and apparatus for transmitting a sounding reference signal of a terminal which may be performed in the above case.

SUMMARY OF THE INVENTION

Accordingly, an object of this specification is to provide a method and apparatus for transmitting a sounding reference signal by a terminal.

In accordance with an aspect of the present invention, a method of transmitting a sounding reference signal of a terminal includes receiving carrier information that indicates a carrier which is to transmit the sounding reference signal, receiving a physical downlink shared channel (PDSCH) through a first downlink component carrier, and transmitting the sounding reference signal through a second uplink component carrier, wherein the second uplink component carrier is determined based on the carrier information.

The first downlink component carrier may be a downlink component carrier without having an uplink component carrier linked by system information.

The downlink component carrier may be a downlink component carrier which is linked with the first uplink component carrier by system information, wherein the first uplink component carrier does not set uplink transmission in a subframe through which the sounding reference signal is transmitted.

The method may further include receiving a physical downlink control channel (PDCCH) that schedules the PDSCH from a serving base station, wherein the PDSCH is received from a cooperating base station performs cooperating transmission with the serving base station, and the sounding reference signal is transmitted to the serving base station.

The PDCCH may include a signal that triggers transmission of the sounding reference signal.

The carrier information may be received through a radio resource control (RRC) signal.

In accordance with another aspect of the present invention, a method of transmitting a sounding reference signal of a terminal includes: receiving a physical downlink shared channel (PDSCH) through a first downlink component carrier, and transmitting the sounding reference signal through a second uplink component carrier, wherein the second uplink component carrier is a predetermined uplink component carrier.

The second uplink component carrier may be an uplink component carrier which is included in a primary cell where the terminal performs an initial connection establishment procedure or connection reestablishment procedure with a base station.

In accordance with another aspect of the present invention, a terminal may include a radio frequency (RF) unit that transmits and receives a wireless signal, and a processor connected to the RF unit, wherein the processor receives carrier information that indicates a carrier to transmit a sounding reference signal, receives a physical downlink shared channel (PDSCH) through a first downlink component carrier, and transmits the sounding reference signal through a second uplink component carrier, wherein the second uplink component carrier is determined based on the carrier information.

The first downlink component carrier may be a downlink component carrier without an uplink component carrier linked by system information.

The first downlink component carrier may be a downlink component carrier which is linked with the first uplink component carrier by system information, wherein the first uplink component carrier does not set uplink transmission in a subframe through which the sound reference signal is transmitted.

The processor may further receive a physical downlink control channel which schedules the PDSCH from a serving base station, wherein the PDSCH is received from a cooperating base station which performs cooperating transmission with the serving base station, and the sounding reference signal is transmitted to the serving base station.

The PDCCH may include a signal that triggers the sounding reference signal.

The carrier information may be received through a radio resource control (RRC) signal.

This specification is advantageous in that a sounding reference signal may be transmitted even when a terminal cannot transmit the sounding reference signal according to a conventional art. The terminal that receives a signal by carrier aggregation or cooperative transmission may smoothly transmit an aperiodic sounding reference signal. Hence, uplink channel measurement and scheduling performance of a system is improved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. Although 3GPP LTE/LET-A is exemplified in the following description for clarity of explanation, technical features of the present invention are not limited thereto.

Base station (BS) is a device that provides communication services to a specific geographic area. Base station means a fixed station to communicate with the terminal, and may be referred to as another terminology such as evolved NodeB (eNB), the Base Transceiver System (BTS), an access point (Access Point), AN (Access Network), etc.

The UE (User Equipment, UE) may be fixed or mobile, and may be referred to as other terms such as MS (Mobile Station), UT (User Terminal), SS (Subscriber Station) and wireless devices, Wireless Device, PDA (Personal Digital Assistant), wireless modem (Wireless Modem), mobile devices (Handheld Device), and AT (Access Terminal).

Below the downlink (DL) refers to the communication from the base station to the terminal, and the uplink (UL) refers to the communication from the terminal to the base station.

A wireless communication system including the base station and the terminal is a system that supports bi-directional communication, a wireless communication system including a base station and terminal. The two-way communication can be carried out using a TDD (Time Division Duplex) mode, FDD (Frequency Division Duplex) mode, etc. The TDD mode uses different time resources in the uplink transmission and the downlink transmission. FDD mode uses different frequency resources in the uplink transmission and the downlink transmission.

Figure 1:
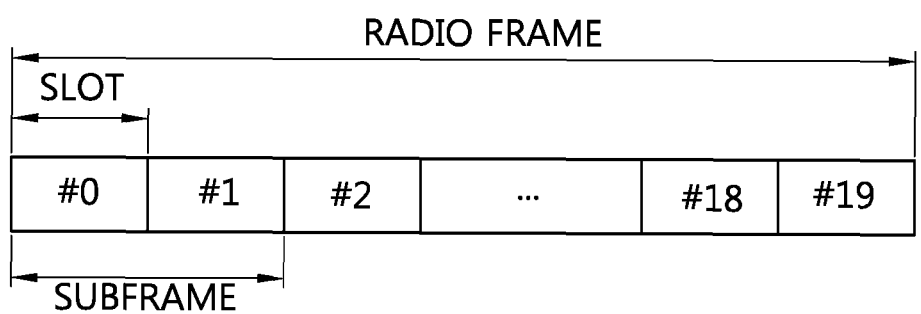
FIG. 1 shows a radio frame structure of 3rd generation partnership project (3GPP) long term evolution (LTE).

FIG. 1 shows a radio frame structure of 3rd generation partnership project (3GPP) long term evolution (LTE).

Referring to FIG. 1, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling. The structure of the wireless frame is merely exemplary, and the number of subframes included in the wireless frame and the number of slots included in the subframe may be variously changed.

Figure 2:
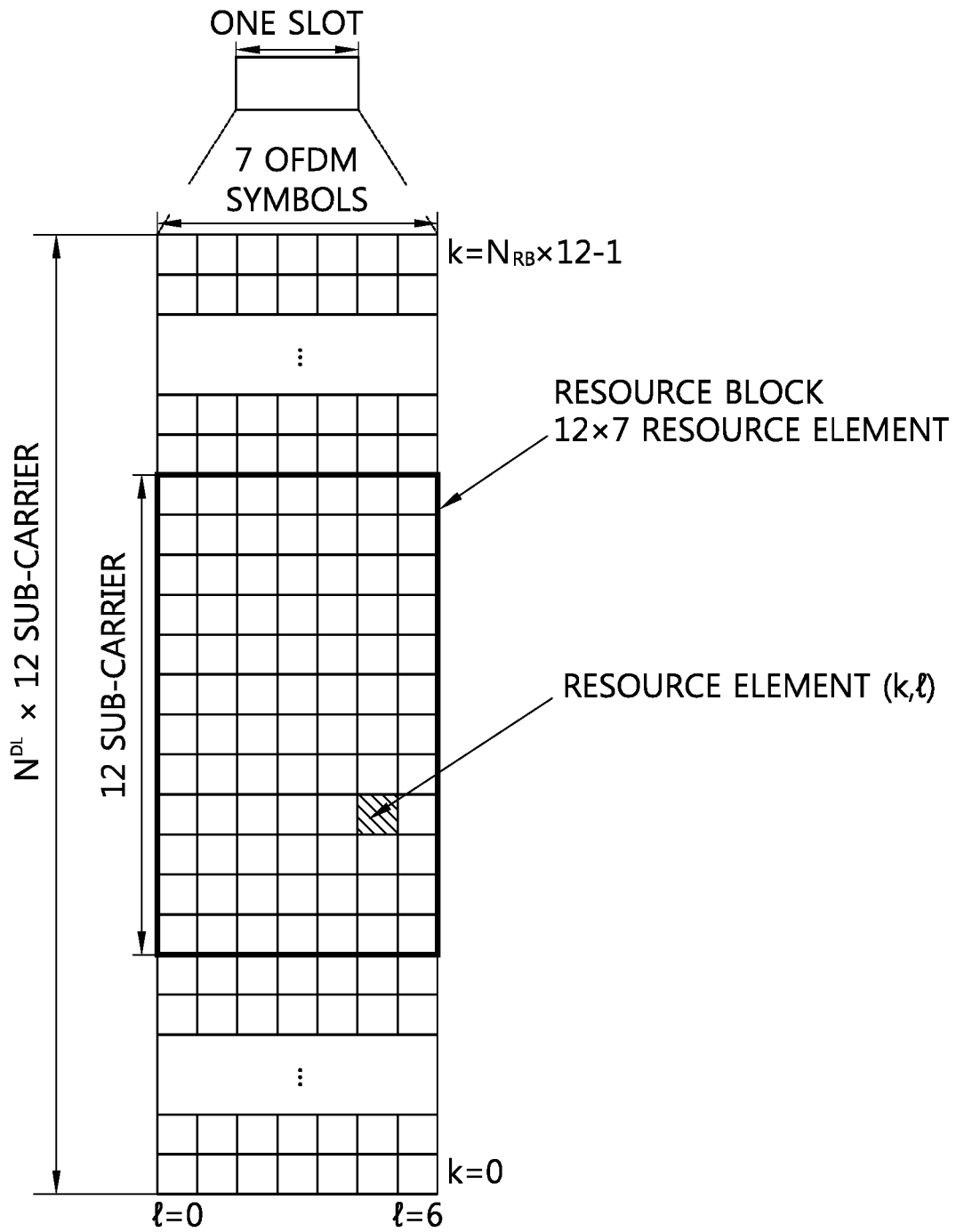
FIG. 2 shows an example of a resource grid for one downlink (DL) slot.

FIG. 2 shows an example of a resource grid for one downlink (DL) slot.

One slot may include a plurality of orthogonal frequency division multiplexing (OFDM) symbols in a time domain. Since the 3GPP LTE uses OFDMA in DL transmission, the OFDM symbol is for representing one symbol period, and may be referred to as other terms. For example, the OFDM symbol may also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), one subframe includes 7 OFDM symbols in case of a normal CP, and includes 6 OFDM symbols in case of an extended CP.

Furthermore, a slot includes a plurality of resource blocks (RB) in a time domain. A resource block includes a plurality of consecutive subcarriers in one slot in resource allocation units. In the resource block, a subcarrier may have an interval of 15 KHz.

Each component on the resource grid is referred to as a resource element (RE), and one resource block includes 12×7 resource elements. $N_{DL}$, which is the number of resource blocks included in the downlink slot, is dependent on the downlink transmission bandwidth which is set in the cell. The resource grid which is described in FIG. 2 may also be applied in the uplink.

Figure 3:
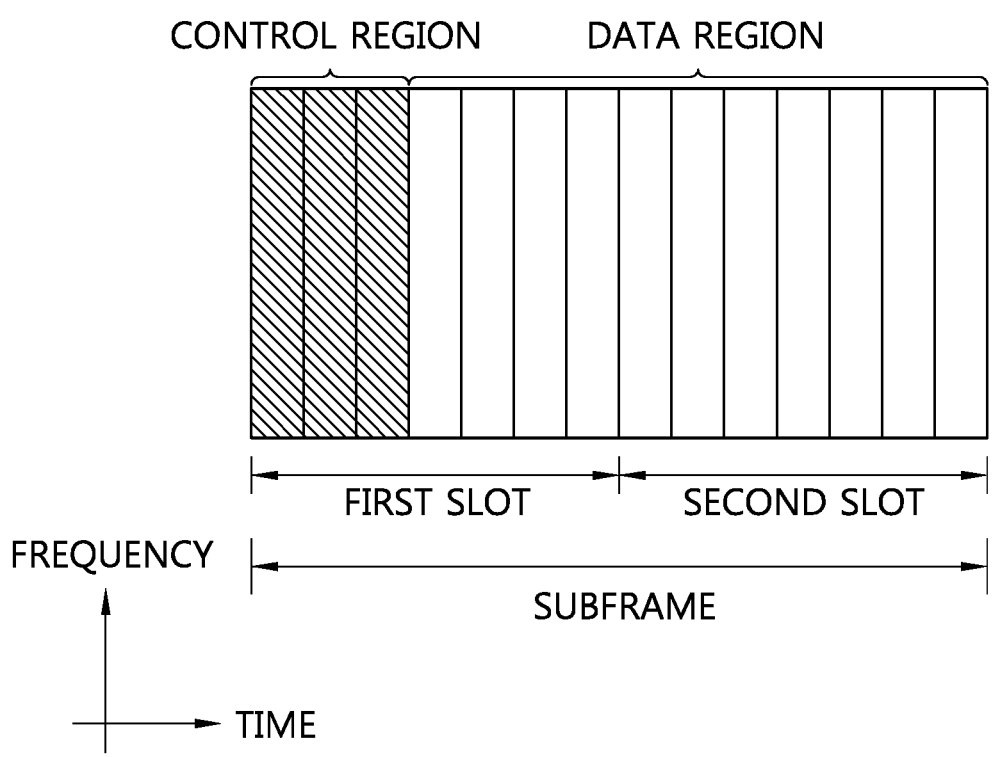
FIG. 3 shows a downlink subframe structure.

FIG. 3 shows a downlink subframe structure.

Referring to FIG. 3, a subframe includes two consecutive slots. In the subframe, up to three preceding OFDM symbols of a 1st slot correspond to a control region to which a physical downlink control channel (PDCCH) is allocated, and the remaining OFDM symbols correspond to a data region to which a physical downlink shared channel (PDSCH) is allocated. The control region may be composed of up to 4 OFDM symbols depending on the system band.

Some examples of the control channel are a physical control format indicator channel (PCFICH) and a physical hybrid-ARQ indicator channel (PHICH). PCFICH is a control channel via which information indicating the size of the control region, i.e., the number of OFDM symbols constituting the control region, is transmitted. PHICH is a control channel via which acknowledgement/not-acknowledgement (ACK/NACK) for uplink data transmission of the terminal is carried. PDCCH may carry resource allocation (also referred to as "downlink grant") and transfer format of downlink-shared channel (DL-SCH), resource allocation information (also referred to as "uplink grant") of uplink shared channel (UL-SCH), paging information on paging channel (PCH), system information on DL-SCH, resource allocation of an upper layer controller message such as a random access response transmitted via PDSCH, a set of transmission power control (TPC) commands for individual user equipments (UE) within a random UE group, activation of voice over Internet protocol (VoIP), etc. Control information transmitted through the PDCCH may be referred to as downlink control information (DCI).

Some examples of the DCI format are format 0 for PUSCH scheduling, format 1 for scheduling of one PDSCH codeword, format 1A for compact scheduling of one PDSCH codeword, format 1B for compact scheduling for rank-1 transmission of single codeword in spatial multiplexing mode, format 1C for very compact scheduling of downlink shared channel (DL-SCH), format ID for PDSCH scheduling gin multi-user spatial multiplexing mode, format 2 for PDSCH scheduling in closed-loop spatial multiplexing mode, format 2A for PDSCH scheduling in open-loop spatial multiplexing mode, format 3 for transmission of transmission power control (TPC) command of 2-bit power regulation for PUCCH and PUSCH, and format 3A for transmission of TPC command of 1-bit power regulation for PUCCH and PUSCH.

Figure 4:
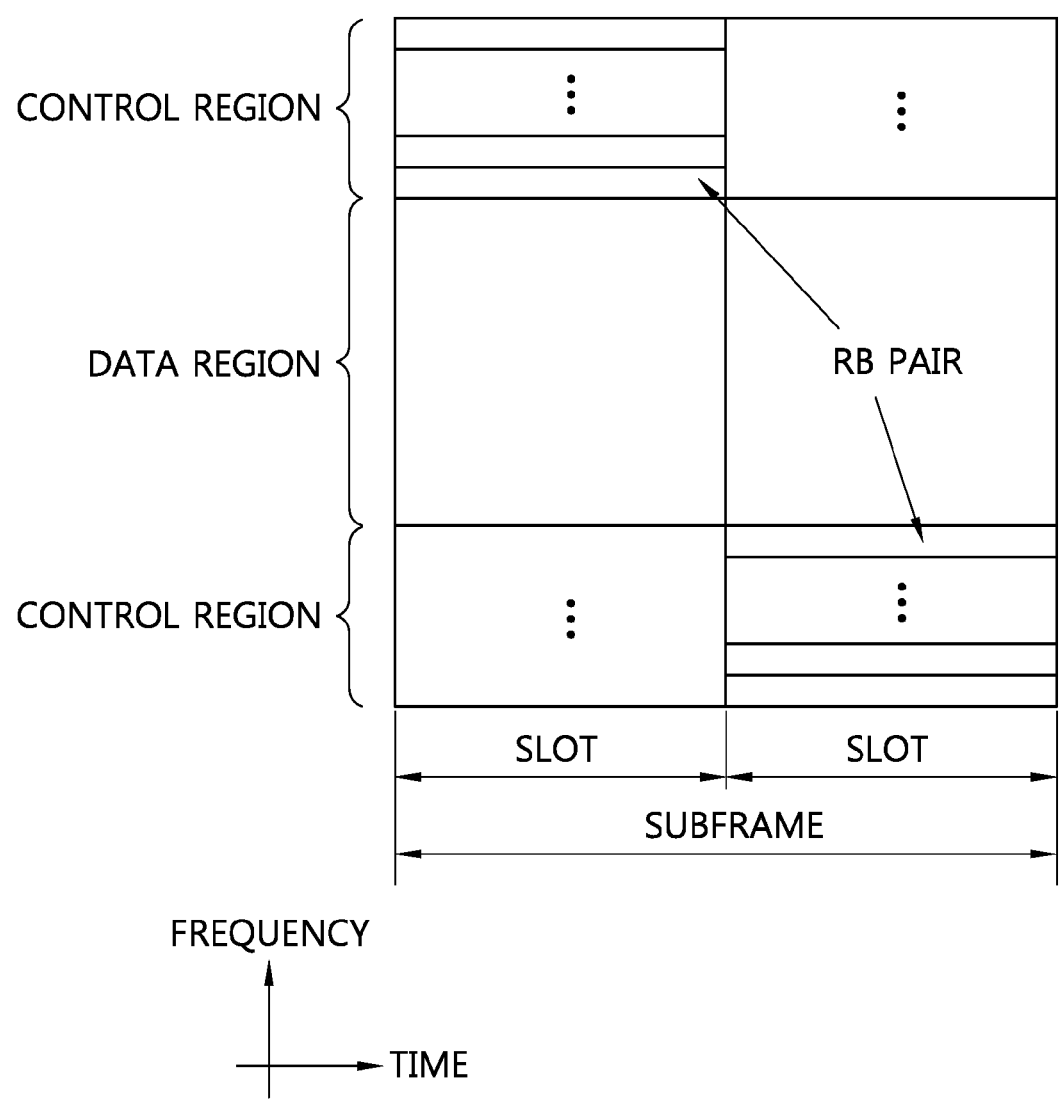
FIG. 4 shows an uplink subframe structure.

FIG. 4 shows an uplink subsframe structure.

Referring to FIG. 4, the uplink subframe may be divided into a control region to which physical uplink control channel (PUCCH) for carrying uplink control information in the frequency domain is allocated, and a data region to which physical uplink shared channel (PUSCH) for carrying user data is allocated.

The PUCCH for one terminal is allocated to a pair of resource blocks (RB) in the subframe, and the RBs which belong to the RB pair occupy sub-carriers which are different for two respective slots. That is, the RB pair allocated the PUCCH is frequency-hopped in the slot boundary.

Hereinafter, the sounding reference signal (SRS) will be described.

The SRS refers to a reference signal which is used for measuring the channel quality in uplink. The SRS performs a function of measuring the channel quality for the uplink and selectively scheduling the frequency by the base station. That is, the SRS is a reference signal which is not related with the uplink data transmission or control information transmission of the terminal.

However, the SRS may also be used for other purposes such as initial modulation and coding scheme (MCS) selection for the terminal which has not been recently scheduled, and initial power control.

(1) Subframe Setting for Transmission of SRS, and Position to which SRS is Transmitted Subframe, through which SRS is transmitted by an arbitrary terminal within the cell, is indicated by cell-specific broadcast signaling. For example, "srsSubframeConfiguration" parameter which is a 4-bit cell-specific signal indicates 15 subframe sets through which SRS may be transmitted within each wireless frame. Such flexible setting possibility provides flexibility in regulating SRS overhead according to the arrangement scenario.

Furthermore, the SRS is transmitted always in the last SC-FDMA symbol of the subframes which have been set. The PUSCH is not transmitted in the SC-FDMA symbol which has been designated as transmission of SRS.

Figure 5:
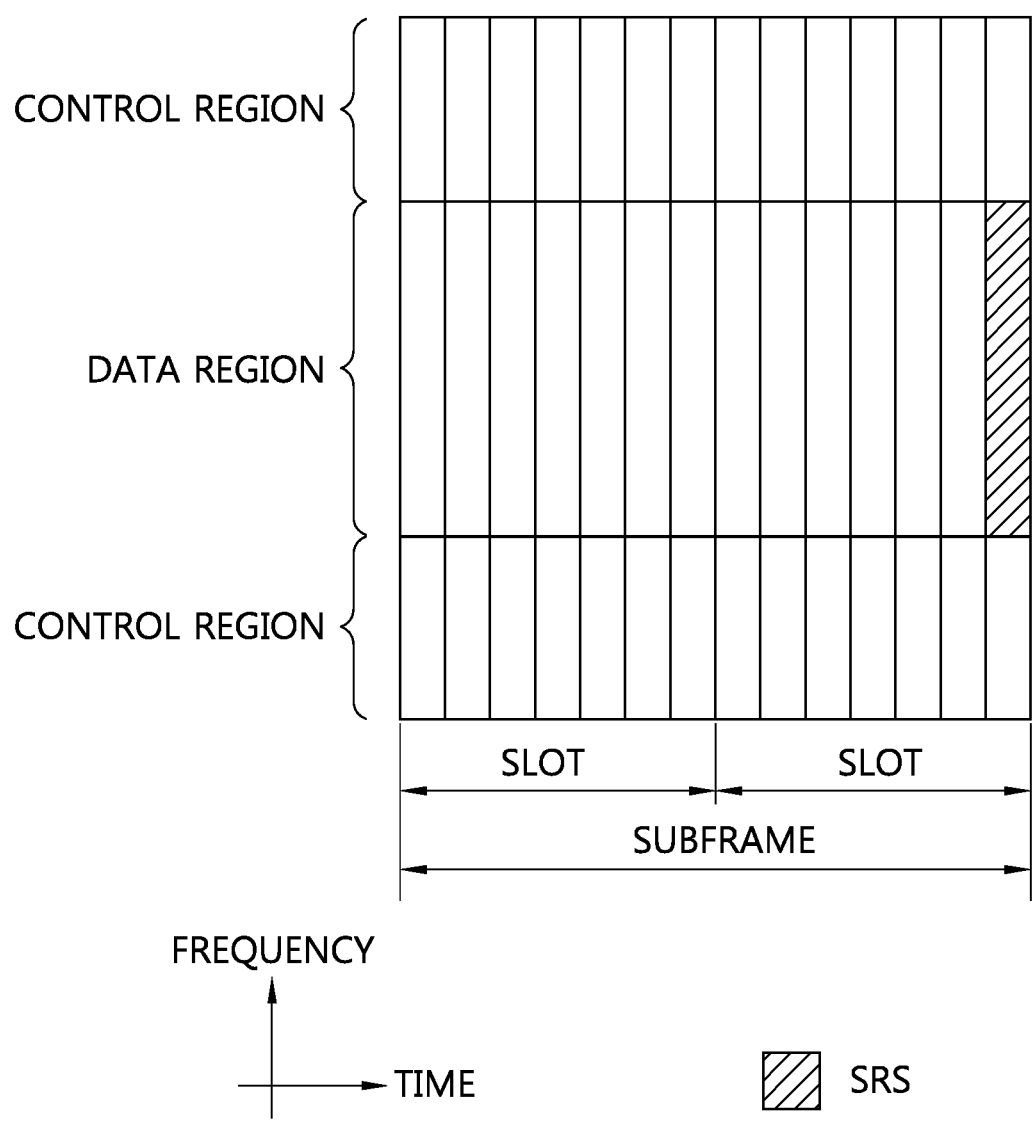
FIG. 5 shows an example of a subframe through which a sounding reference signal is transmitted.

FIG. 5 shows an example of a subframe through which a sounding reference signal is transmitted.

Referring to FIG. 5, the sounding reference signal is transmitted through 1 SC-FDMA symbol within the subframe. The SC-FDMA symbol of the section where the sounding reference signal is transmitted is referred to as a sounding symbol. Here, the last SC-FDMA symbol is the sounding symbol among 14 SC-FDMA symbols that constitute the subframe, but this is merely an example, and the location or number of sounding symbols within the subframe may be variously changed.

The sounding reference signal is not transmitted in the control region, but is transmitted in the data region. The terminal may transmit the sounding reference signal through all frequencies (or subcarriers) of the data region or through some frequencies of the data region. When the terminal transmits the sounding reference signal through some frequencies, each subframe, through which the sounding reference signal is transmitted, may be hopped to a different frequency to be transmitted. Furthermore, the terminal may transmit the sounding reference signal by using only the subcarrier of the even or odd number index.

(2) Duration and Cycle of SRS Transmission

The base station may 1) request individual SRS transmission to the terminal or 2) set the terminal to periodically transmit SRS until the transmission is stopped. To this end, a 1-bit UE-specific parameter, i.e., "duration", is used, and this parameter indicates whether the requested SRS transmission is a one-time transmission or periodic. If the periodic SRS transmission is set to the terminal, the cycle may be one of 2, 5, 10, 20, 40, 80, 160, or 320 ms.

The cycle within which the terminal needs to transmit SRS, and the subframe offset value within the cycle are indicated by the UE-specific parameter (referred to as "srsConfigurationIndex").

(3) SRS Band

In LTE, up to 4 SRS bands are simultaneously supported to support many SRSs. 8 sets are defined for each of the 4 SRS bands in order to provide flexible setting for the SRS band value. The base station provides a 3 bit-cell-specific parameter called "srsBandwidthConfiguration" through RRS signaling, and one of the 8 sets is indicted through this parameter.

Table 1 below shows 8 sets for each of 4 SRS bands when the uplink system band has a range between 80 to 110 resource blocks.

TABLE 1

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Which of the 4 SRS bands would be used may be set by a 2-bit UE-specific parameter (referred to as "srsBandwidth"). As shown in Table 1 above, the smallest supported SRS band is a 4-resource block. Such a small SRS band is used when a power-limited terminal provides higher-quality channel information.

Furthermore, the SRS band is set to mutually have a multiple relation. This is for providing frequency hopping between different SRS bands. The frequency hopping is set to be possible or impossible according to the value of the parameter called "frequencyDomainPosition" which is provided to each terminal.

Table 2 below shows a summary of SRS parameters which are signaled to the terminal.

TABLE 2

| SRS parameter | meaning | Signal transmission type |
|---|---|---|
| srsBanwidthConfiguration | Maximum SRS band within cell | Cell-specific |
| srsSubframeConfiguration | Set of subframes through which SRS may be transmitted within cell | Cell-specific |
| srsBandwidth | SRS transmission band of terminal | UE-specific |
| frequencyDomainPosition | Position of frequency domain | UE-specific |
| srsHoppingBandwidth | Size of frequency hop | UE-specific |
| Duration | Indicating single SRS or periodic recognition | UE-specific |
| srsConfigurationIndex | Cycle and subframe offset | UE-specific |
| transmissionComb | Transmission comb offset | UE-specific |
| $n^{CS}_{SRS}$ | Cyclic shift | UE-specific |

In Table 2 above, "srsBandwidthConfiguration" indicates the maximum band where the SRS may be transmitted within the cell.

"srsSubframeConfiguration" indicates a possible set of subframes through which SRS may be transmitted within each wireless frame. "srsSubframeConfiguration" is a signal which is broadcast in a cell-specific manner, and is transmitted to the terminal within the cell. The signal may be composed of 4 bits. The SRS may be transmitted in the last SC-FDMA symbol within the subframes through which the SRS may be transmitted. The uplink data transmission of the terminal may not be allowed in the SC-FDMA symbol where the SRS is transmitted.

"srsBandwidth" indicates the SRS transmission band of the terminal. The SRS transmission band may be determined according to the number of terminals which may be supported by the base station, etc. "duration" is a parameter that indicates whether the base station requests one-time SRS transmission to the terminal or sets the terminal to periodically transmit SRS. The terminal may transmit SRS only once by this parameter or may be periodically transmitted to the base station.

"transmissionComb" indicates the subcarrier to which the SRS transmitted by the terminal is allocated. In a multi-user environment, it is necessary to overlap SRSs which are transmitted from different terminals and have different SRS bands. To this end, 2 person interleaved FDMA (IFDMA) is used as a repetition factor (RPF) in the SC-FDMA symbol where SRS is transmitted. For example, in the SRS transmission band, it may be indicated whether the SRS is transmitted in (odd number)th subcarrier or the SRS is transmitted in (even number)th subcarrier. In the time domain, the RRF is operated as the decimation factor. In SC-FDMA symbol where the SRS is transmitted, the subcarrier, through which the SRS is transmitted, comes to have a comb-like spectrum like a comb. That is, the subcarrier, through which the SRS is transmitted, is composed of only (even number)th subcarriers in the allocated sounding band. The terminal is allocated a parameter called "transmissionComb" due to the IFDMA structure of the symbol where the SRS is transmitted. "transmissionComb" has a value of 0 or 1, and notifies from where the SRS is transmitted.

Furthermore, the SRS may be aperiodically transmitted by the request of the base station. If the base station dynamically gives a triggering signal through PDCCH, such an aperiodic SRS transmission indicates that the terminal transmits the SRS.

Figure 6:
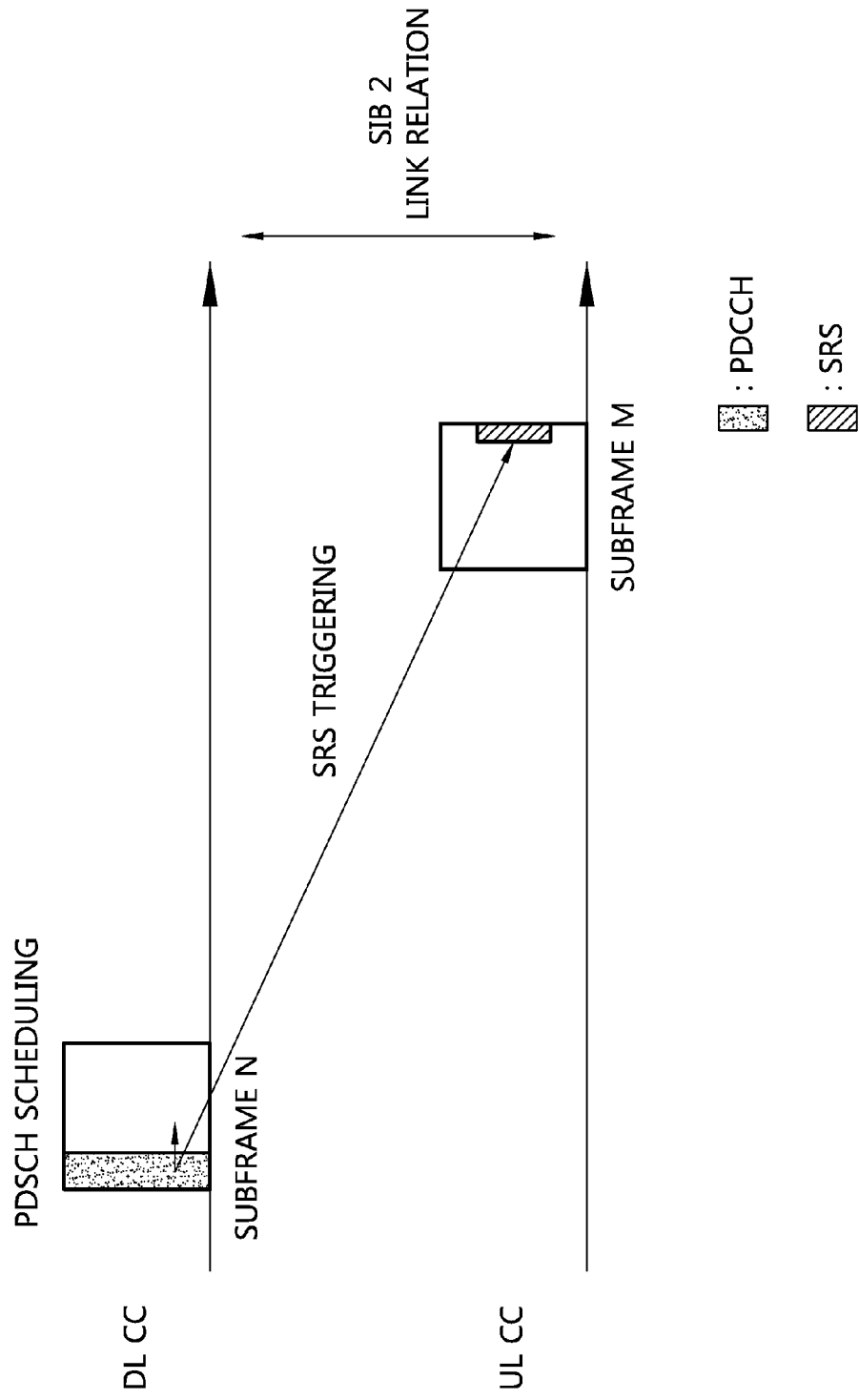
FIG. 6 shows SRS transmission of a terminal when a SRS triggering signal is transmitted through PDCCH including a DL grant.

FIG. 6 shows SRS transmission of a terminal when a SRS triggering signal is transmitted through PDCCH including a DL grant.

Referring to FIG. 6, the DCI format 1A may be transmitted through the PDCCH of subframe N. The DCI format 1A is used in a compact scheduling or random access process of one PDSCH codeword, and the following information is transmitted to the DCI format 1A. 1) Flag for distinguishing DCI format 0 from DCI format 1A, 2) localization/distribution virtual RB (VRB) designation flag, 3) resource block designation, 4) modulation and coding scheme, 5) HARQ process number, 6) new data indicator, 7) redundancy version, 8) transmission power control (TPC) command for PUCCH, 9) downlink designation index (only in TDD), 10) SRS request (0 or 1 bit), etc. That is, the SRS request may be included in the DCI format that schedules the PDSCH. Then the terminal may transmit SRS in subframe M. Subframe M is an example of the subframes for transmitting SRS.

Figure 7:
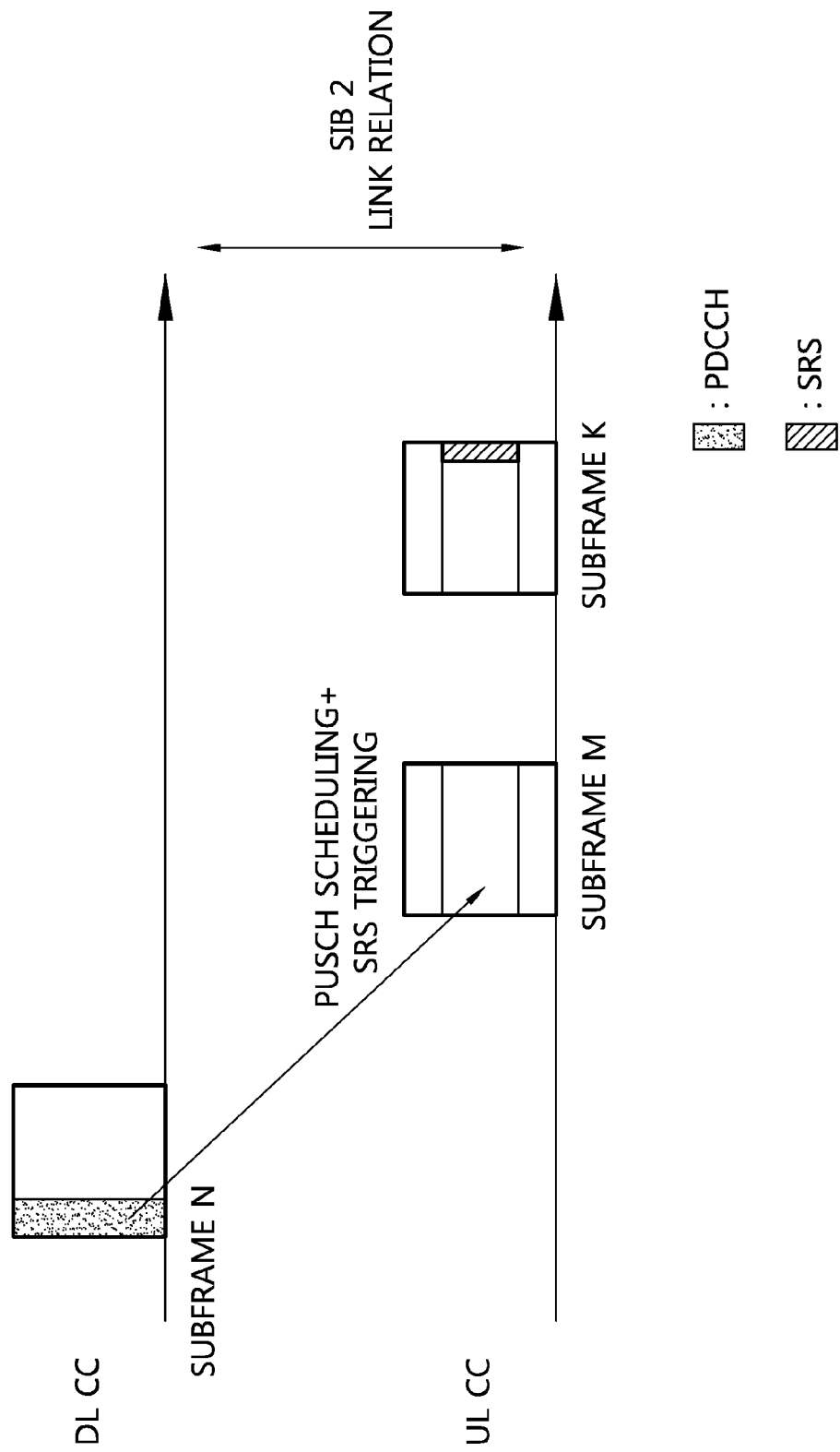
FIG. 7 shows SRS transmission of a terminal when a SRS triggering signal is transmitted through PDCCH including an UL grant.

FIG. 7 shows SRS transmission of a terminal when a SRS triggering signal is transmitted through PDCCH including an UL grant.

Referring to FIG. 7, DCI format 0 may be transmitted through PDCCH of subframe N. DCI format 0 is used for PUSCH scheduling, and the information (field) transmitted through DCI format 0 is as follows. 1) flag for distinguishing DCI format 0 from DCI format 1A (indicating DCI format 0 if 0, and indicating DCI format 1A if 1), 2) hopping flag (1 bit), 3) resource block designation and hopping resource allocation, 4) modulation and coding scheme and redundancy version (5 bits), 5) new data indicator (1 bit), 6) TPC command (2 bits) for scheduled PUSCH, 7) circular shift for DM-RS (3 bits), 8) UL index, 9) downlink designation index (only for TDD), 10) CQI request, 11) SRS request (0 or 1 bit), etc. That is, 1 bit SRS request may be included in DCI format that schedules PUSCH. That is, the terminal may transmit SRS in subframe K. Subframe K is an example of a subframe through which SRS may be transmitted.

Furthermore, the next-generation communication system such as 3GPP LTE-A may be a multi-carrier system that supports carrier aggregation. The multi-carrier system refers to a system that constitutes a broadband by collecting one or more carriers having a bandwidth smaller than the targeted broadband when a wireless communication system tries to support the broadband. The multi-carrier system may be called as another name such as a carrier aggregation system, a bandwidth aggregation system, etc.

Figure 8:
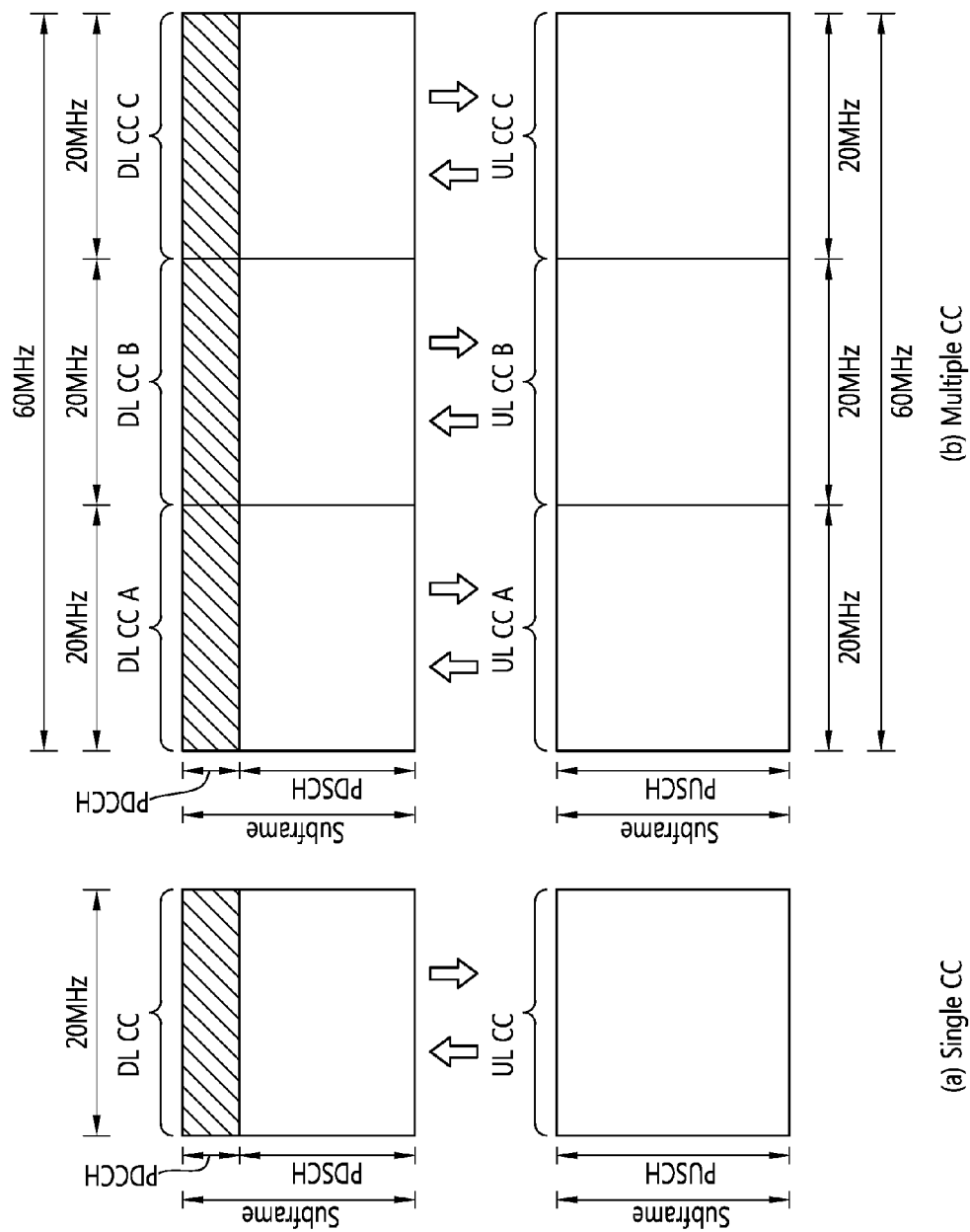
FIG. 8 shows an example of comparing the conventional single carrier system with a multi-carrier system.

FIG. 8 shows an example of comparing the conventional single carrier system with a multi-carrier system.

Referring to FIG. 8, in a single carrier system, only one carrier is supported to the terminal in uplink and downlink. There are several bandwidths of the carrier, but there may be only one carrier allocated to the terminal. In contrast, in the multi-carrier system, a plurality of component carriers (DL CC A to C, UL CC A to C) may be applied to the terminal. For example, three 20 MHz component carriers are allocated to allocate the 60 MHz bandwidth to the terminal.

The multi-carrier system may be divided into a contiguous carrier aggregation system where respective aggregated carriers are contiguous and a non-contiguous carrier aggregation system where respective carriers are contiguous. Below, simply a multi-carrier system should be understood to include both a case where element carries are contiguous and a case where the component carriers are non-contiguous.

When aggregating one or more component carriers, the component carrier which becomes the subject when aggregating one or more component carriers may use the bandwidth which is used in the conventional system for backward compatibility with the conventional system. For example, 3GPP LTE system supports 1.4 MHz, 3 MHz, 5 MHz, 10 MHz, 15 MHz, and 20 MHz bandwidths, and 3GPP LTE-A system may constitute a broadband more than 20 MHz using only the bandwidth of the 3GPP LTE system. Furthermore, the bandwidth may be constituted by defining a new bandwidth without using the bandwidth of the conventional system.

The system frequency band of a wireless communication system is divided into a plurality of carrier frequencies. Here, the carrier frequency refers to the center frequency of a cell. Below, the cell may refer to downlink frequency resources (i.e., downlink component carrier) and uplink frequency resources (i.e., uplink component carrier). Furthermore, the cell may refer to the combination of downlink frequency resources and optional uplink frequency resources. Furthermore, generally, when not considering the carrier aggregation (CA), the uplink component carrier and the downlink component carrier may exist as a pair in one cell.

In order to perform transmission and reception of packet data through a particular cell, the terminal first needs to complete the configuration for the particular cell. Here, the configuration refers to a state where reception of the system information, which is needed for data transmission and reception for the cell, is completed. For example, the configuration may include the overall process of receiving common physical layer parameters needed for data transmission and reception, MAC layer parameters, or parameters needed for a particular operation in the RRC layer. The setting-completed cell is in a state where the packet transmission and reception becomes promptly possible if only the information indicating that the packet data may be transmitted is received.

The cell in the setting-completed state may exist in an activated or deactivated state. Here, the activated state refers to the state where data transmission or reception are performed or are ready. The terminal may monitor or receive the PDCCH or PDSCH of the activated cell to check the allocated resources (frequency, time, etc.).

The deactivated state refers to a state where the transmission and reception of traffic data is not possible, and measuring and transmission/reception of minimum information are possible. The terminal does not monitor or receive the PDCCH and PDSCH of the deactivated cell to check the resources (frequency, time, etc.) allowed to the terminal.

The cell may be divided into a primary cell (PCell), a secondary cell (SCell), and a serving cell.

The primary cell (PCell) refers to a cell in which the terminal performs an initial connection establishment procedure or connection reestablishment procedure with the base station, or a cell indicated as a primary cell in the handover procedure.

The secondary cell refers to a cell which provides additional wireless resources which are set after RRC connection is established.

The serving cell is composed of primary cells in the case of the terminal in which carrier aggregation is not set or carrier aggregation cannot be provided. When the carrier aggregation is set, the term "serving cell" indicates a cell which is set to the terminal, and may be plural. A plurality of serving cells may be composed of a set including the primary cell and one or more of all secondary cells.

The primary component carrier (PCC) refers to a CC corresponding to the primary cell. The PCC is CC which initially forms connection or RRC connection with the base station. The PCC is a CC which is in charge of connection or RRC connection for signaling about a plurality of CCs, and manages terminal context which is connection information related with the terminal. Furthermore, the PCC always exists in the activated state when connection with the terminal is formed and the PCC is in RRC connected mode. The downlink component carrier corresponding to the primary cell is called the downlink primary component carrier (DL PCC), and the uplink component carrier corresponding to the primary cell is called the uplink primary component carrier (UL PCC).

The secondary component carrier (SCC) refers to a CC corresponding to a secondary cell. That is, the SCC is a CC allocated to the terminal except the PCC, and the SCC is an extended carrier which is extended for additional resource allocation by the terminal except the PCC and may be divided into an activate state and a deactivated state. The downlink component carrier corresponding to the secondary cell is called a downlink secondary component carrier (DL SCC), and the uplink component carrier corresponding to the secondary cell is called an uplink secondary component carrier (UL SCC).

The primary cell and the secondary cell have the following characteristics.

First, the primary cell is sued for transmission of the PUCCH. Second, the primary is always in an activated state, but the secondary is activated or deactivated according to a particular condition. Third, when the primary cell experiences the wireless link failure (radio link failure (RLF)), the RRC reconnection is triggered. Fourth, the primary cell may be changed by the handover procedure that accompanies the security key change or random access channel (RACH) procedure. Fifth, non-access stratum (NAS) information is received through the primary cell. Sixth, in the case of the FDD system, the primary cell is always composed of a pair of DL PCC and UL PCC. Seventh, different component carriers (CC) may be set as the primary cell for each terminal. Eighth, the primary cell may be replaced only through the handover, cell selection/cell reselection procedure. In adding a new secondary cell, RRC signaling may be used in transmitting system information of the dedicated secondary cell.

The DL CC may form one serving cell, or the DL CC may be connected to the UL CC to form one serving cell. However, the serving cell is not formed by only one UL CC.

The activation/deactivation of the component carrier is the same as the concept of the activation/deactivation of the serving cell. For example, when assuming that serving cell 1 is not composed of DL CC1, activation of serving cell 1 means activation of DL CC1. When assuming that DL CC2 is connected to UL CC2, activation of serving cell 2 means activation of DL CC2 and UL CC2. Likewise, each component carrier may correspond to the cell.

The multi-carrier system may support cross-carrier scheduling. The cross-carrier scheduling is a scheduling method capable of allocating resources of the PDSCH which are transmitted through other component carriers through the PDCCH which is transmitted through a particular component carrier, and/or allocating resources of PUSCH which are transmitted through other component carriers other than the component carrier which has been basically linked. That is, the PDCCH and the PDSCH may be transmitted through different downlink CCs, and the PUSCH may be transmitted through an uplink CC other than the uplink CC linked to the downlink CC through which the PDCCH including the UL grant is transmitted. Likewise, in the system that supports the cross-carrier scheduling, the carrier indicator indicating the DL CC/UL CC through which the PDSCH/PUSCH are transmitted is needed. Below, the field including the carrier indicator is referred to as the carrier indication field (CIF).

The multi-carrier system that supports the cross-carrier scheduling may include a carrier indication field (CIF) in the conventional downlink control information (DCI). In a system that supports cross-carrier scheduling, for example, LTE-A system, CIF is added to the existing DCI format (i.e., DCI format used in LTE), and thus 1 to 3 bits may be extended, and the PDCCH structure may reuse the existing coding method, the resource allocation method (i.e., CCE-based resource mapping), etc.

Furthermore, in the multi-carrier system, the number of component carriers, which are aggregated between the downlink and the uplink, may be differently set. The case where the number of downlink CCs is the same as the number of uplink CCs is called a symmetric aggregation, and the case where the number of downlink CCs is different from the number of uplink CCs is called an asymmetric aggregation.

Figure 9:
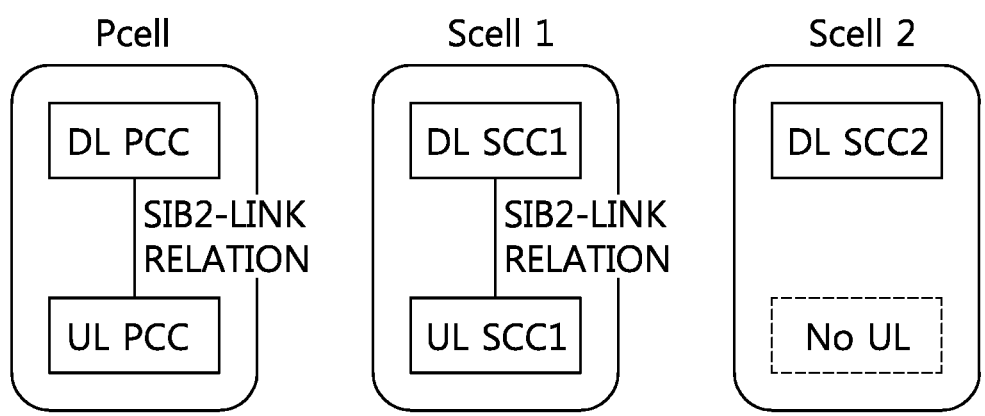
FIG. 9 shows asymmetric aggregation as a situation when three serving cells are set in a terminal.

FIG. 9 shows asymmetric aggregation as a situation when three serving cells are set in a terminal.

Referring to FIG. 9, PCell, SCell 1, and SCell 2 are set in the terminal. Furthermore, in PCell, DL PCC is linked with UL PCC by SIB 2. In SCell 1, DL SCC 1 is linked with UL SCC 1 by SIB 2. In contrast, in SCell 2, only DL SCC 2 exists.

Figure 10:
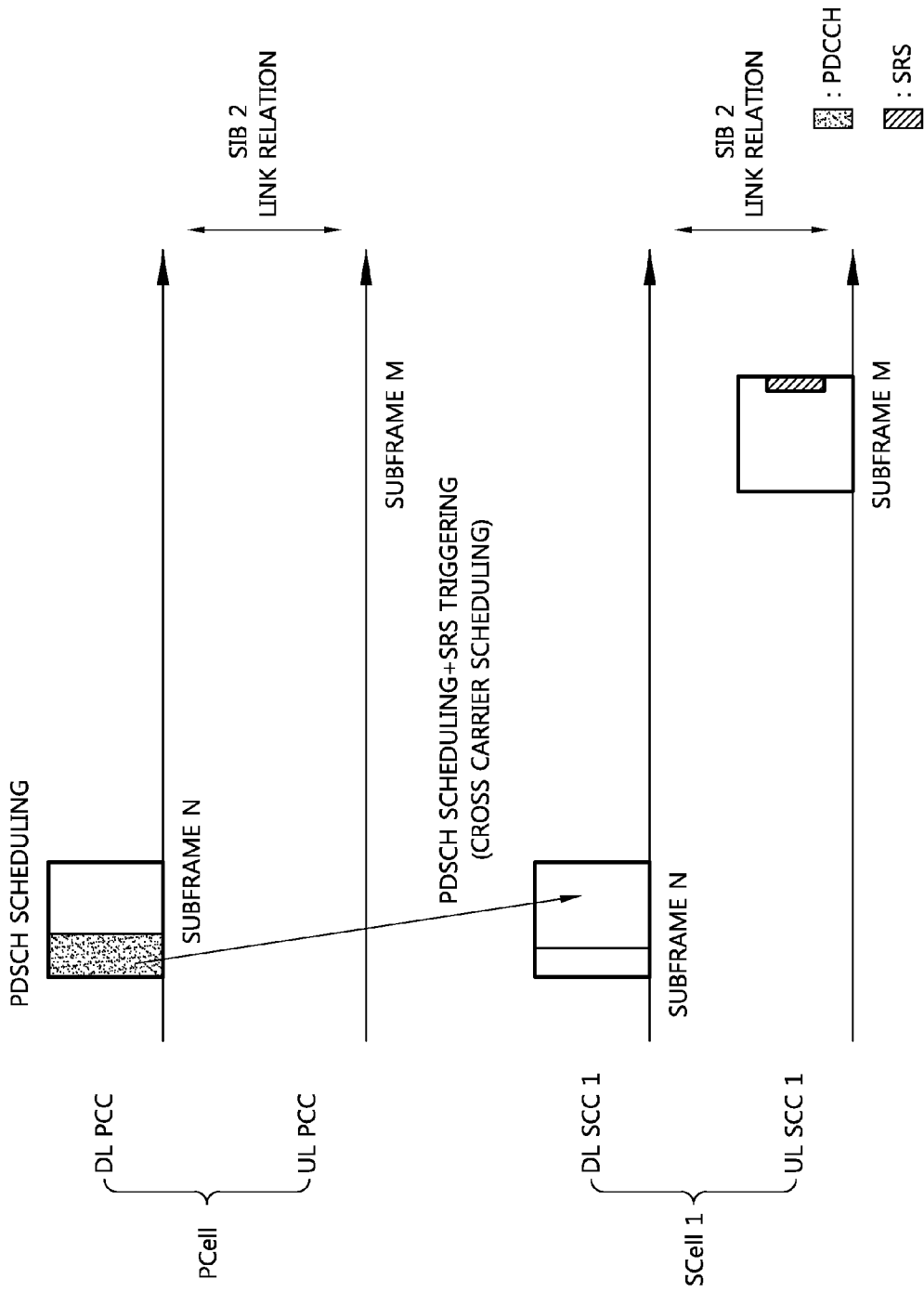
FIG. 10 shows an example of an SRS triggering method in the situation of FIG. 9.

FIG. 10 shows an example of an SRS triggering method in the situation of FIG. 9.

Referring to FIG. 10, the base station PDCCH through DL PCC of PCell.

This PDCCH may include an SRS triggering signal while scheduling the PDSCH of subframe N which is transmitted in DL SCC 1 of SCell 1. Likewise, when cross-carrier scheduling is performed, according to the conventional art, the terminal transmits SRS to the DL SCC 1 of the SCell 1 which receives the PDSCH, through subframe M of the UL SCC 1 which is linked by SIB 2.

SIB 2 is one of types of system information. The system information is constituted through system information blocks (SIB), and each system information block includes a set of parameters related with the function. The system information block is divided into various types as follows.

1. Master information block (MIB): The MIB includes essential parameters which are related with the initial access to the network of the terminal, and such parameters are a limited number of parameters which are most frequently transmitted. The MIB may be transmitted through physical broadcast channel (PBCH).

2. SIB 1: SIB 1 includes parameters related with information on time domain scheduling of other SIBs and cell selection.

3. SIB 2: SIB 2 includes common channel information. For example, SIB 2 may include information indicating link relationship between the uplink component carrier and the downlink component carrier.

In addition to the above-described system information block, there are SIB 3 to SIB 8. The SIBs may be transmitted through PDSCH.

That is, according to the conventional art, SRS is transmitted through the uplink component carrier which is linked with the downlink component carrier that receives the PDSCH, by SIB 2.

As shown in FIG. 10, when each serving cell exists as a pair of DL CC and UL CC, the SRS transmission may not become a problem even by the conventional art.

Figure 11:
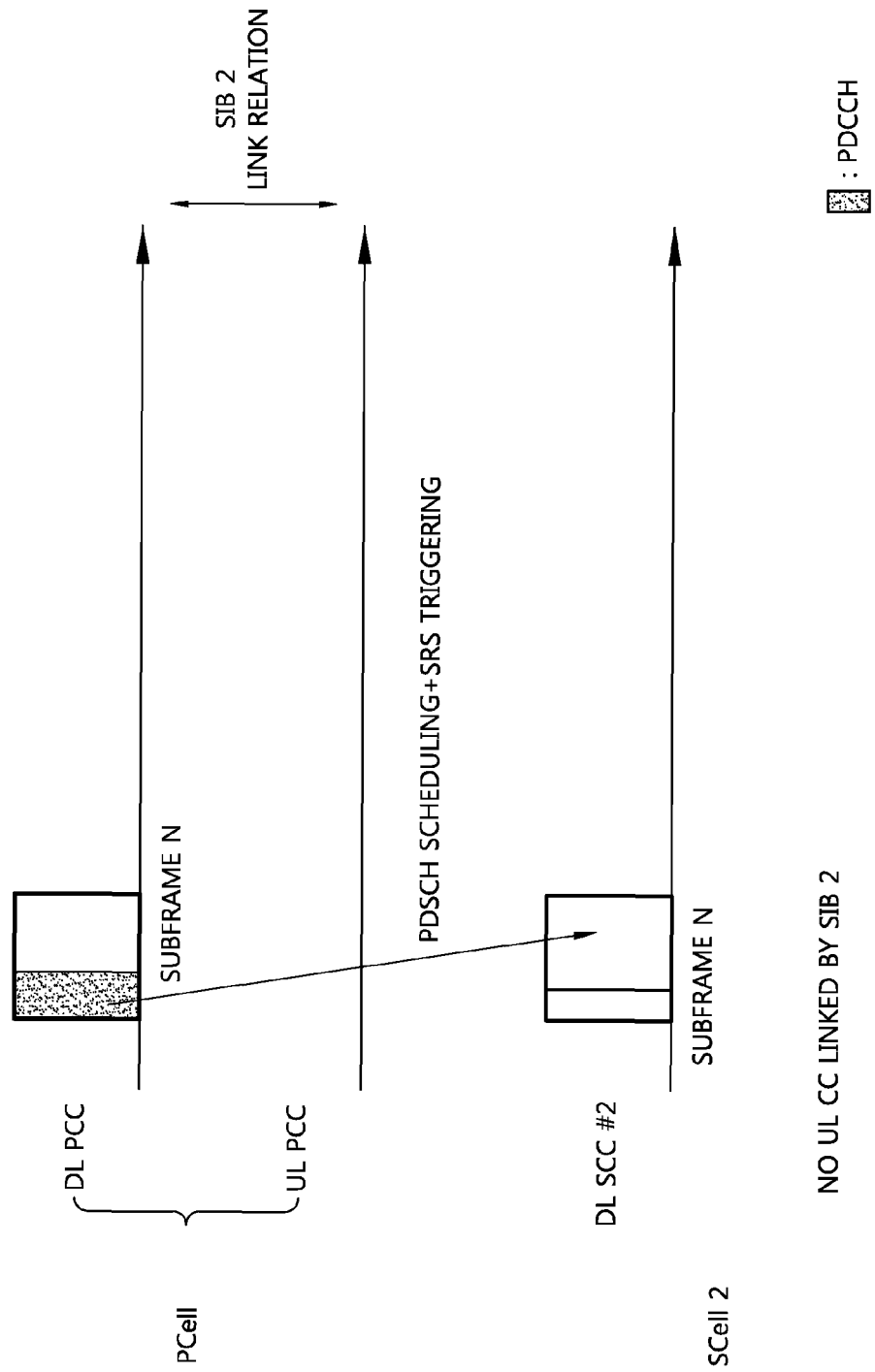
FIG. 11 shows a case where SRS transmission becomes a problem in the situation of FIG. 9.

FIG. 11 shows a case where SRS transmission becomes a problem in the situation of FIG. 9.

Referring to FIG. 11, PCell is composed of DL PCC and UL PCC, but SCell 2 is composed of only DL SCC 2. In such a case, the base station may transmit PDCCH in subframe N of DL PCC of PCell. At this time, the PDCCH may include the SRS triggering signal while scheduling DL SCC 2 of SCell 2. At this time, the UL CC, which is linked with DL SCC 2 of SCell 2 which receives the PDSCH, by SIB 2, may not exist. Hence, the selection of a serving cell for SRS transmission through the UL CC of the serving cell is a problem in the terminal.

The problem is not limited to the multi-carrier system. For example, the same problem may occur in the cooperated multi-point transmission/reception (CoMP).

First, the term for CoMP is defined.

Below, CA set refers to a set of cells which are aggregated by the terminal. CA cell means a cell which belongs to the CA set.

The primary cell (PCell) means one of cells which belong to the CA set as described above, and has the following attributes. That is, the PCell is a cell having RRC connection with the base station for the first time among cells which are being aggregated by the terminal. The terminal acquires main system information such as PDCCH in the common search space, and PBCH through the downlink component carrier. Furthermore, PUCCH, which carries ACK/NACK, CSI, etc., may be transmitted through the uplink component carrier of PCell. In other words, the cell having the above attributes is called PCell.

SCell means cells other than the PCell among cells which are aggregated by the terminal.

CoMP set refers to cells, to which CoMP operation is applied, among cells which are aggregated by the terminal. Here, the cell, to which the CoMP operation is applied, refers to a cell which participates in or becomes a candidate to participate in various CoMP operations such as joint transmission (JT) that simultaneously transmits signals by cooperation of a plurality of base stations, coordinated scheduling (CS) which transmits signals by one base station, dynamic cell selection, and coordinated beaming forming (CB) which performs beam forming by cooperation of a plurality of base stations.

ComP cell refers to a cell which is included in the CoMP set.

Among ComP cells, ComP PCell refers to a cell having the following characteristics, among cells which belong to the CoMP set. That is, when cross-carrier scheduling is applied within the CoMP set, CoMP PCell is a cell which transmits PDCCH that schedules PDSCH/PUSCH transmission for CoMP cells which belongs to CoMP set. Such CoMP PCell may be set as the same as the above described PCell, or may be set separately from the PCell through RRC signaling.

CoMP SCell refers to a cell other than CoMP PCell among cells which belong to the CoMP set.

In the above definition, the component carrier, which is included in SCell or CoMP SCell, may be a new-type carrier other than the previously-defined carrier. That is, the conventional carrier follows the conventional standard so that the terminal may solely have a direct access. For example, in the conventional carrier, the PBCH through which system information is transmitted, synchronization channel, common reference signal (CRS), and common control channels exists according to the conventional standard. However, in the present invention, the component carriers, which are used in SCell, CoMP, and SCell, are not limited to the same carrier as the existing carrier. That is, the synchronization channel, CRS, etc. does not exist in the conventional terminal, and thus may not be recognized, but a recognizable new-type carrier may be possible in the advanced terminal. When SCell is used by carrier aggregation in a state where RRC connection has already been established, PBCH, synchronization channel, etc. may be an unnecessary channel, and thus there may be a limit in the efficient use of frequency resources.

Figure 12:
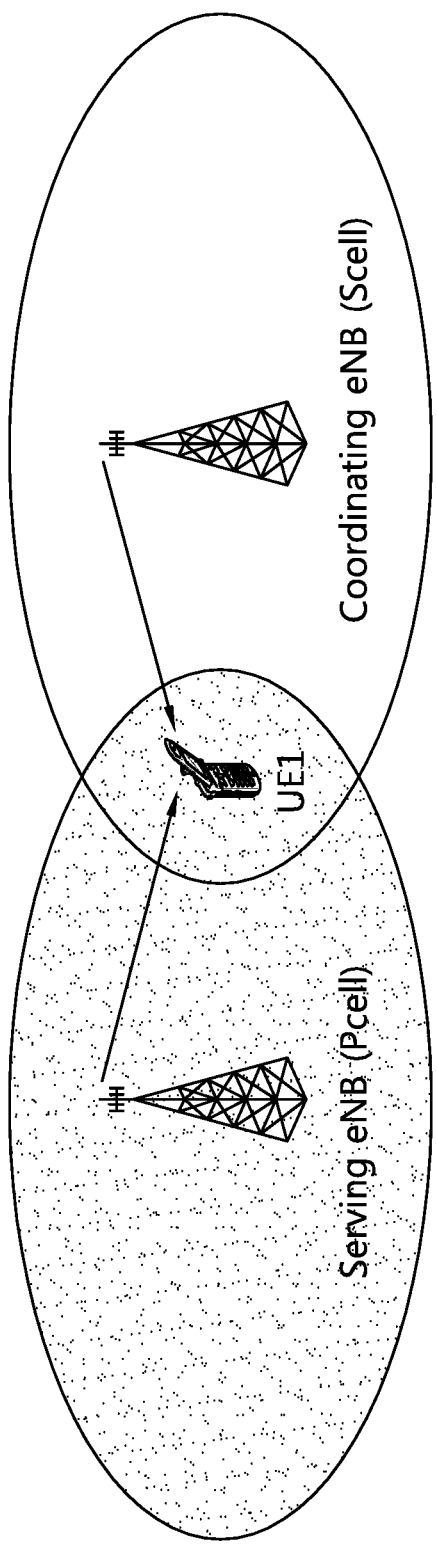
FIG. 12 shows a CoMP system to which the present invention may be applied.

FIG. 12 shows a CoMP system to which the present invention may be applied. In FIG. 12, the cell which is used by the serving base station, and the cell which is used by the cooperating base station, are a CoMP set, and the cell used by the serving base station may be CoMP PCell and the cell used by the cooperating base station may be CoMP SCell.

Referring to FIG. 12, terminal 1 exists within the coverage of the serving base station, and, at the same time, exists within the coverage of the cooperating base station. That is, terminal 1 may exist at an external part of the coverage of the serving base station. The carrier used by the serving base station and the carrier used by the cooperating base station may have the same frequency band, or have different frequency bands. The carrier used by each base station may be identified by the carrier indication field (CIF).

Terminal 1 may receive PDCCH from the serving base station, and may selectively or simultaneously receive the PDSCH scheduled by the PDCCH from the serving base station or the cooperating base station. At this time, when an SRS triggering signal exists in the PDCCH, the selection of the UL CC for SRS transmission may be a problem in terminal 1.

As described above, in the carrier aggregation situation, when there is no UL CC, which is linked by SIB 2, for the DL CC through which PDSCH scheduled through PDCCH is transmitted, or when uplink transmission is not set in the subframe through which SRS needs to be transmitted even if there is UL CC, which is linked by SIB 2, for the DL CC through which PDSCH is transmitted for some CoMP cells in CoMP situation, such situations may be problem.

In order to solve this problem, the UL CC for transmitting the aperiodic SRS may be predetermined as a particular UL CC (or particular UL CC group). For example, the particular UL CC may be the CC which is set, such that the terminal receives system information or transmits PUCCH. That is, it may be predetermined that the SRS is always transmitted through the UL PCC of PCell.

Figure 13:
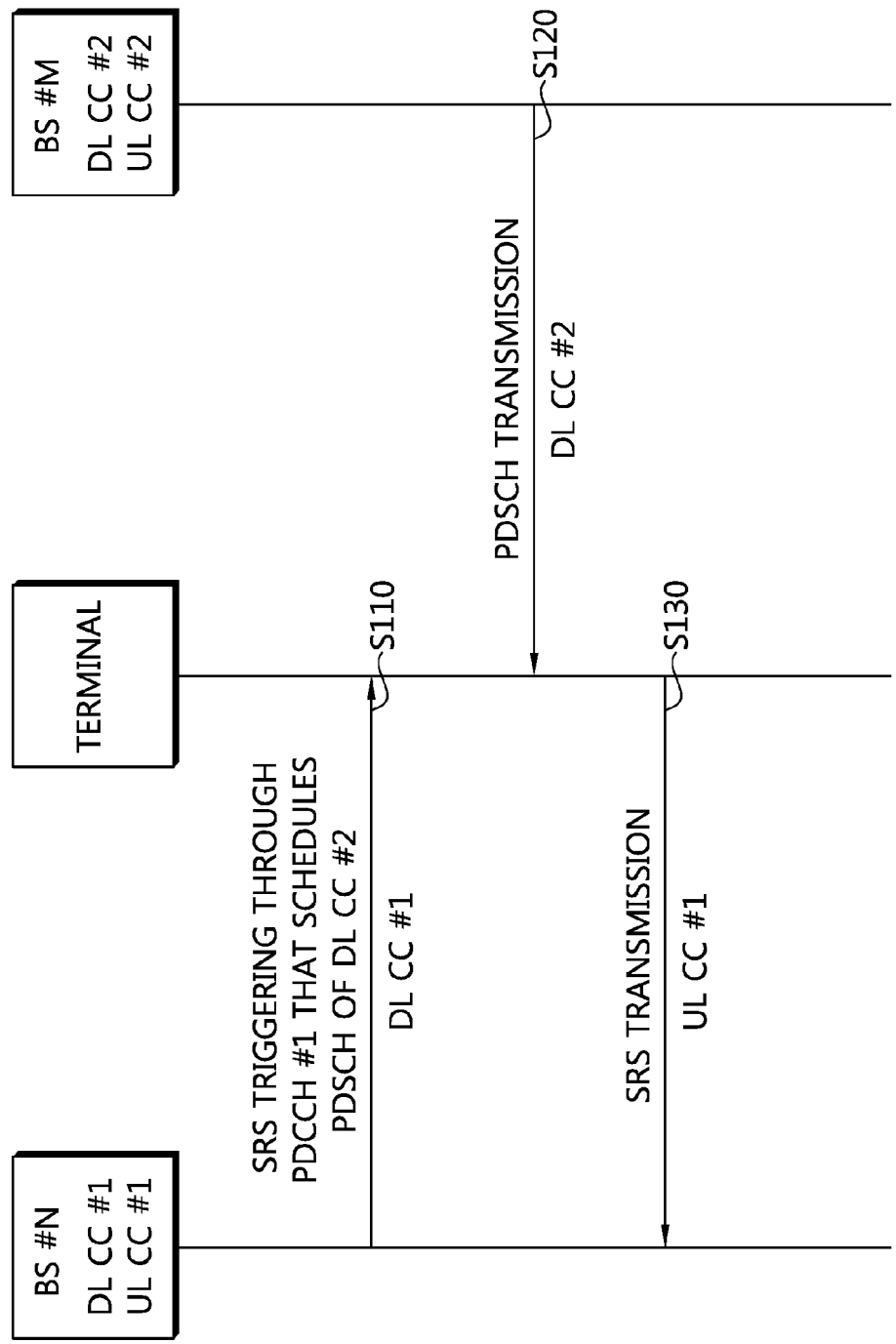
FIG. 13 shows a SRS transmission method of a terminal according to an embodiment of the present invention.

FIG. 13 shows a SRS transmission method of a terminal according to an embodiment of the present invention.

Referring to FIG. 13, it is assumed that the base station #N uses DL CC #1 and UL CC #1, and the base station #M uses DL CC #2 and UL CC #2. At this time, the base station #N and the base station #4 perform CoMP operation.

Base station #4 may trigger the SRS through PDCCH #1 which schedules PDSCH of DL CC #2 (S110). At this time, PDCCH #1 may be transmitted through DL CC #1.

Base station #M transmits PDSCH through DL CC #2 (S120).

The terminal transmits SRS through predetermined UL CC #1 (S130). Here, DL CC #1 may be DL PCC, and UL CC #1 may be UL PCC.

Furthermore, when there is no UL CC that is linked with DL CC, through which PDSCH scheduled through PDCCH is transmitted, by SIB 2, or even though there is such an UL CC linked by SIB 2, if uplink transmission is not set in the subframe for transmitting SRS, the UL CC for transmitting aperiodic SRS triggered by the PDCCH may use the UL CC or UL CC set which is indicated through UE-specific RRC signaling. Such a method is advantageous in that there is overhead by RRC signaling, but flexible setting is possible.

Figure 14:
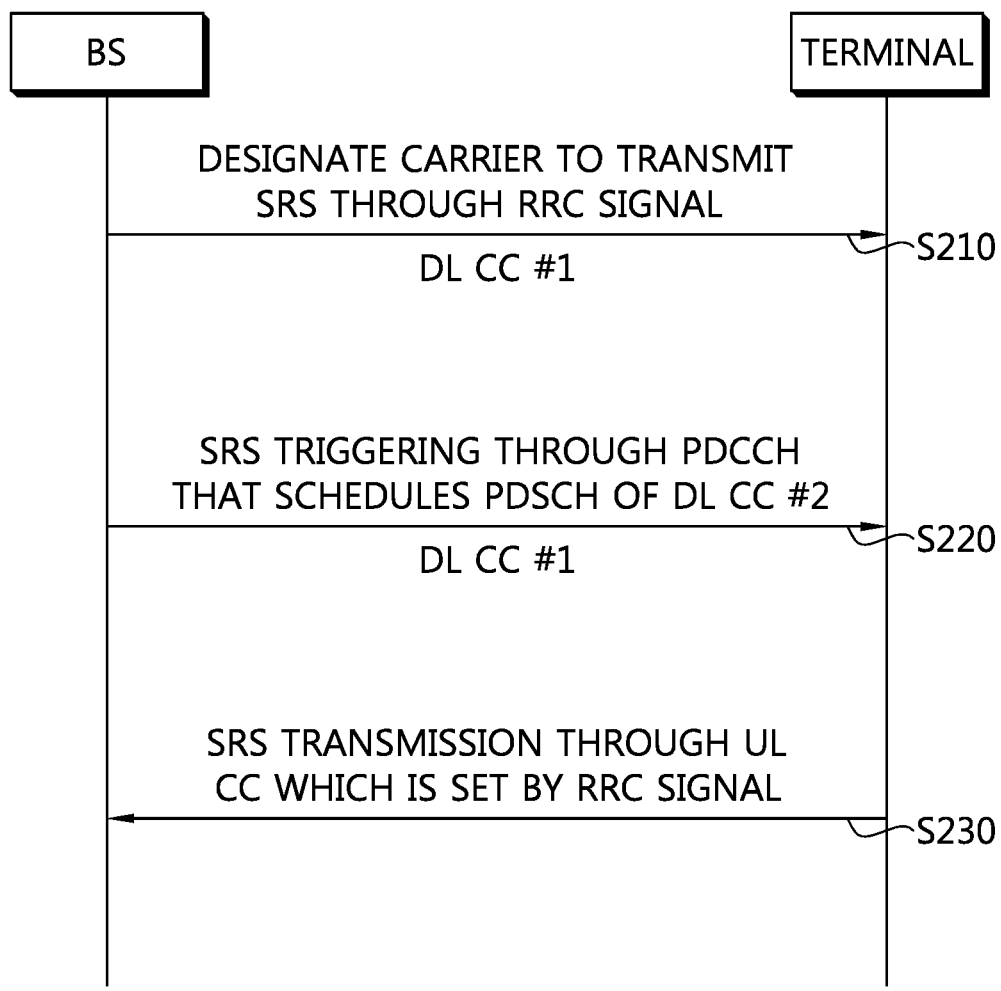
FIG. 14 shows a SRS transmission method of a terminal according to another embodiment of the present invention.

FIG. 14 shows a SRS transmission method of a terminal according to another embodiment of the present invention. At this time, it is assumed that, in the terminal, serving cell #1 composed of DL CC#1 and UL CC#1 and serving cell #2 composed of only DL CC#2 are set.

Referring to FIG. 14, the base station indicates the carrier to transmit SRS through RRC signal (S210). The RRC signal may be transmitted through CL CC #1. The RRC signal may include time information for transmitting SRS through the carrier as well as the carrier for transmitting SRS. That is, the SRS may be set to be transmitted through the carrier only during the time period which is specified by the time information. Information and time information to indicate the carrier for transmitting the SRS included in the RRC signal may have a UE-specific value.

The base station may trigger the SRS through PDCCH which schedules the PDSCH of DL CC #2 (S220). The PDCCH may be transmitted through DL CC #1.

The terminal transmits the SRS through UL CC which is set by RRC signal (S230). For example, when the carrier to transmit the SRS is indicated as UL CC#1, by the RRC signal, the terminal may receive the PDSCH through DL CC #2, but the SRS may be transmitted through UL CC#1. Hence, even though there is no UL CC linked with DL CC#2, the terminal may transmit the SRS. Furthermore, even when there is UL CC linked with DL CC#2, but there is not uplink transmission in the subframe for transmitting the SRS, the terminal may transmit the SRS.

Additionally, the SRS may be transmitted by applying the following methods.

When there is no UL CC that is linked with the DL CC which has received the PDSCH scheduled through PDCCH, by SIB 2, or even though there is UL CC linked by SIB 2, if the uplink transmission is not set in the subframe, the terminal may be set to transmit the SRS through all UL CCs. If the activated/deactivated state is different for each UL CC, the SRS may be transmitted using only the activated UL CC.

Furthermore, in the case of the cross-carrier scheduling, the aperiodic SRS may be set to be transmitted through the UL CC, which is linked with the DL CC that transmits the PDCCH including the SRS triggering signal, by SIB 2. For example, in the example of FIG. 9, in the case of the cross-carrier scheduling, the DL PCC may be set to the DL CC through which the PDCCH is transmitted. Here, there is always the UL PCC linked with the DL PCC by SIB 2, and thus the SRS may be transmitted through UL PCC.

Furthermore, in the case of non-cross carrier scheduling, the PDCCH is transmitted through DL SCC 2 of SCell 2, and at this time, UL CC, which is linked with DL SCC 2, by SIB 2, does not exist. Hence, the PDCCH transmitted from the DL SCC 2 may be set not to include the signal that triggers the aperiodic SRS, or may be set such that the terminal does not transmit the SRS.

Furthermore, the PDCCH, which schedules the PDSCH that is transmitted to the DL CC which is not linked with the UL CC by SIB 2, may be set not to include a signal that triggers the aperiodic SRS even if the PDCCH is used in the cross-carrier scheduling. Furthermore, even if the signal that triggers the aperiodic SRS is included in the PDCCH, the terminal may not transmit the SRS and disregard the signal.

Through the above-described method, the terminal may transmit the SRS even when there is no UL CC which is linked with the DL CC, through which PDSCH that is scheduled through PDCCH is transmitted, by SIB 2, or when uplink transmission is not set in the subframe that needs to transmit the SRS even though there is UL CC linked by SIB 2, the SRS may be transmitted. The base station may estimate the uplink channel quality by measuring the SRS, and may perform scheduling using the result of estimation. As a result, the system performance and efficiency are enhanced.

Figure 15:
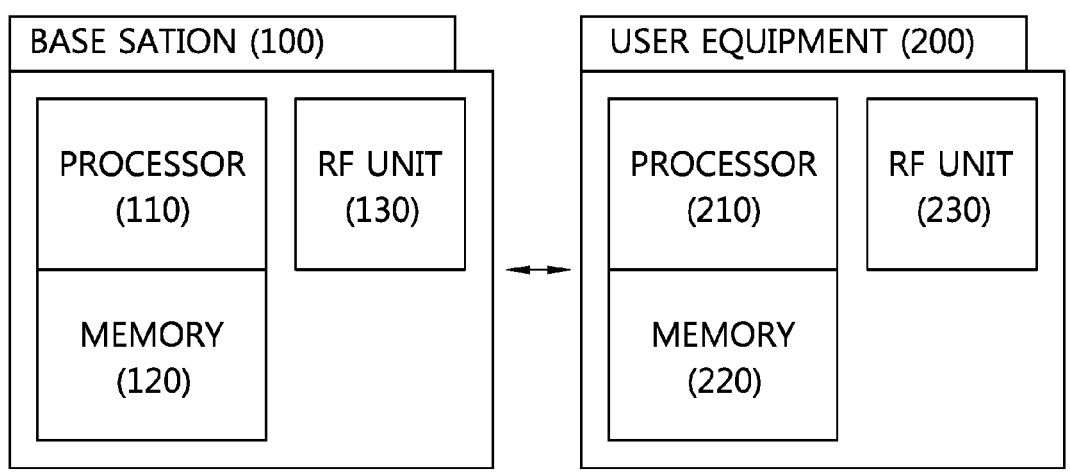
FIG. 15 is a block diagram showing a base station and a terminal.

FIG. 15 is a block diagram showing a base station and a terminal.

A base station 100 includes a processor 110, a memory 120, and a radio frequency (RF) unit 130. The processor 110 implements a suggested function, process, and/or method. For example, the processor 110 indicates the carrier through which the terminal is to transmit the SRS through the RRC signal, and may transmit time information to which the carrier may be applied. Furthermore, the processor 110 may measure the SRS transmitted by the terminal to calculate the uplink channel quality and perform scheduling.

The memory 120 may be connected to the processor 110 to store various sets of information for operating the processor 110. The RF unit 130 is connected to the processor 110 to transmit and/or receive wireless signals.

A terminal 200 includes a processor 210, a memory 220, and an RF unit 230. The processor 210 performs the above-described function, process, and method. For example, the processor 210 may receive the carrier information and time information for transmitting the SRS through the RRC signal, and transmit the SRS through the carrier. Furthermore, the SRS triggering signal included in the PDCCH may be disregarded, and the SRS may not be transmitted. The layers of the wireless interface protocol may be implemented by the processor 210. The memory 220 is connected to the processor 210, and stores various sets of information for operating the processor 210. The RF unit 230 is connected to the processor 210, and transmits and/or receives wireless signals.

The processor 110 or 210 may include an application-specific integrated circuit (ASIC), a different chipset, a logical circuit, a data processing apparatus and/or a converter that mutually converts a baseband signal and a wireless signal. The OFDM transmitter and the OFDM receiver of FIG. 7 may be implemented within the 110 or 210. The memory 120 or 220 may include a read-only memory (ROM), a random access memory (RAM), a flash memory, a memory card, a storage medium and/or another storage device. The RF unit 130 or 230 may include one or more antennas that transmit and/or receive wireless signals. When an exemplary embodiment is implemented in software, the above-described scheme may be implemented as a module (process, function, etc.) that performs the above-described function. The module may be stored in the memory 120 or 220, and may be performed by the processor 110 or 210. The memory 120 or 220 may exist within or outside the processor 110 or 210, and may be connected to the processor 110 or 210 by various well-known means.

A person having ordinary skill in the art to which the present invention pertains may change and modify the present invention in various ways without departing from the technical spirit of the present invention. Accordingly, the present invention is not limited to the above-described embodiments and the accompanying drawings.

What is claimed is:

1. A method for transmitting a sounding reference signal (SRS) of a user equipment for which a plurality of uplink component carriers (UL CCs) are configured, the method comprising:
   receiving system information that indicates a link relationship between a downlink component carrier (DL CC) and an uplink component carrier (UL CC), through a first physical downlink shared channel (PDSCH) of a first DL CC;
   receiving a downlink grant through a physical downlink control channel (PDCCH) of the first DL CC, wherein the downlink grant schedules a second PDSCH on a second DL CC and triggers the SRS; and
   transmitting the SRS,
   wherein:
   if the system information indicates that a specific UL CC among the plurality of UL CCs is linked with the second DL CC where the second PDSCH has been received, the SRS is transmitted through the specific UL CC, and
   if the system information indicates that no UL CC is linked with the second DL CC where the second PDSCH has been received, the SRS is transmitted through all activated UL CCs among the plurality of UL CCs configured for the UE.

2. A user equipment (UE) for which a plurality of uplink component carriers (UL CCs) are configured, the UE comprising:
   a radio frequency (RF) unit configured to transmit and receive a radio signal; and
   a processor connected to the RF unit, wherein the processor is configured to:
receive system information that indicates a link relationship between a downlink component carrier (DL CC) and an uplink component carrier (UL CC), through a first physical downlink shared channel (PDSCH) of a first DL CC,
receive a downlink grant through a physical downlink control channel (PDCCH) of the first DL CC, wherein the downlink grant schedules a second PDSCH on a second DL CC and triggers the SRS, and
transmit the SRS,
wherein:
if the system information indicates that a specific UL CC among the plurality of UL CCs is linked with the second DL CC where the second PDSCH has been received, the SRS is transmitted through the specific UL CC, and
if the system information indicates that no UL CC is linked with the second DL CC where the second PDSCH has been received, the SRS is transmitted through all activated UL CCs among the plurality of UL CCs configured for the UE.

* * * * *